United States Patent [19]
Whitney et al.

[11] 3,735,347
[45] May 22, 1973

[54] CHANGE DETECTOR SYSTEM

[75] Inventors: John A. Whitney; Peter F. Sorensen, both of Fort Wayne, Ind.

[73] Assignee: Franklin Electric Co., Inc., Bluffton, Ind.

[22] Filed: Nov. 2, 1971

[21] Appl. No.: 194,858

[52] U.S. Cl............340/146.2, 235/92 FQ, 324/78 D
[51] Int. Cl.................................................G06f 7/02
[58] Field of Search................................340/146.2; 235/92 FQ, 92 EV, 92 T, 151.3, 151.31, 151.32; 324/78 D; 307/222

[56] References Cited
UNITED STATES PATENTS

| | | | |
|---|---|---|---|
| 3,624,649 | 11/1971 | Ranieri | 235/92 EV X |
| 3,548,183 | 12/1970 | Jouve | 235/92 EV X |
| 3,582,882 | 6/1971 | Titcomb et al. | 340/146.2 |

OTHER PUBLICATIONS
Taylor, "Analog-To-Digital Converter," IBM Tech. Disc. Bull., Vol. 3, No. 10, March 1961, pgs. 128-129

*Primary Examiner*—Malcolm A. Morrison
*Assistant Examiner*—James F. Gottman
*Attorney*—Lowell C. Noyes and Donald J. Bratt

[57] ABSTRACT

This disclosure deals with a system for detecting a change in a parameter represented by an analog signal. Integrating means receives the signal during a first time period and again during a second time period. The two time periods are preferably equal in duration and are adjoining. The results of the integration during the first period is compared with that of the second period. When the two time periods are equal, the results will be equal if the parameter has not changed during the two periods. If the results are different, a change in the parameter is indicated.

7 Claims, 3 Drawing Figures

CHANGE DETECTOR SYSTEM

When measuring a quantity or parameter represented by a signal, it is usually desirable to take a measurement when the signal is unchanging, in order to obtain an accurate measurement of the parameter. In a weighing system, for example, it is necessary to let the weight receiving pan settle after placing an article thereon before making a measurement, and a measurement should not be made when vibrations disturb the pan. Photocell arrangements have been used to detect motion, but motion detectors of this character are inadequate where the measuring apparatus experiences little or no motion.

It is therefore an object of the present invention to provide a change detecting system which receives an analog signal representing a parameter to be measured. The system includes integrating means which receives the signal during two time periods. During each period the signal is integrated, and at the end of the two periods the results of the two integrations are compared. Where the two periods have equal time durations, the two integrations are equal if the parameter has not changed during the two periods. Inequality indicates a change in the parameter during the two periods. The two periods are preferably consecutive in time and have equal time durations.

Other objects, features and advantages of the invention will be apparent from the following detailed description taken in conjunction with the accompanying figures of the drawings, wherein.

Figure 1:
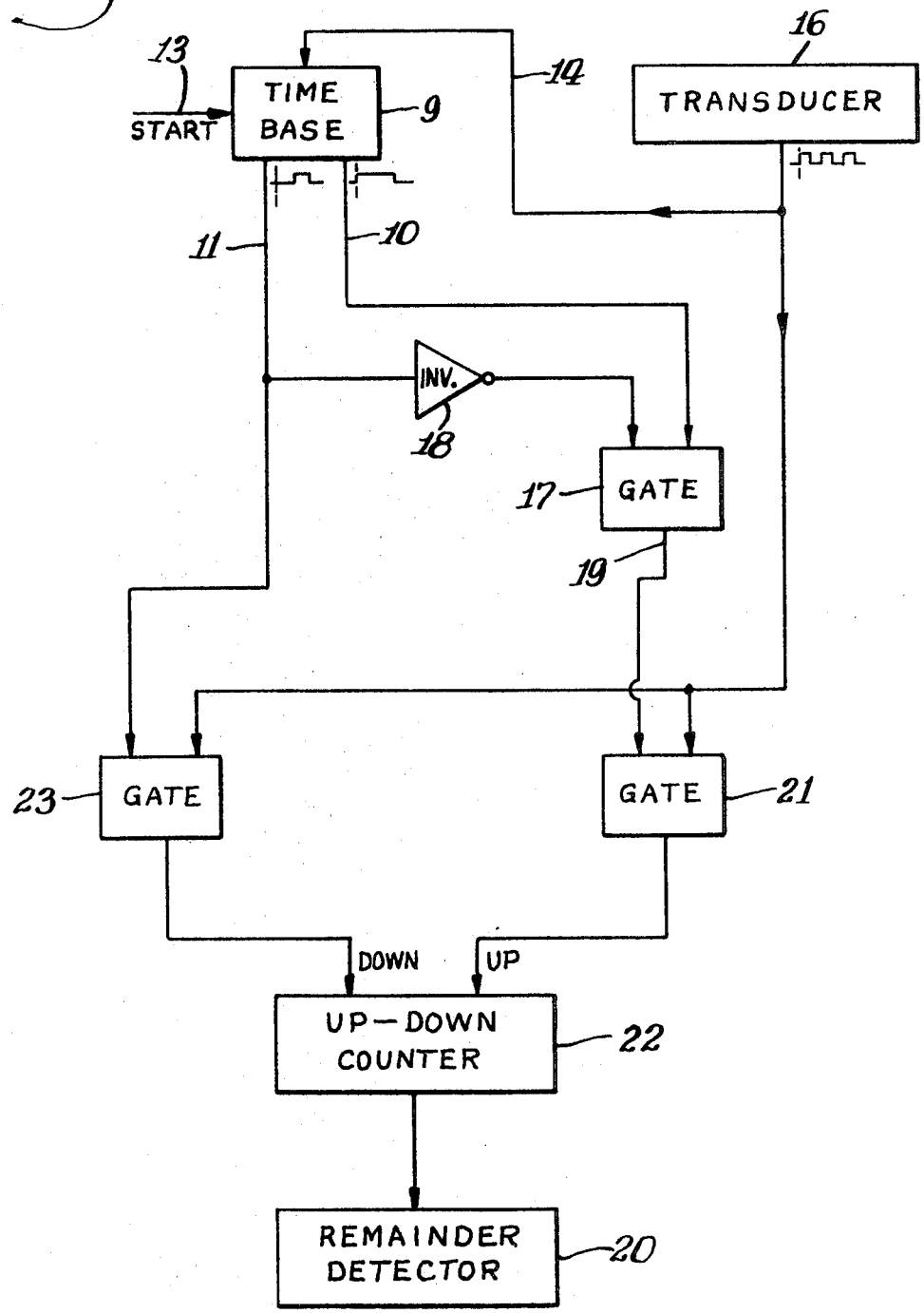
FIG. 1 is a block diagram of a frequency change detecting circuit embodying the invention.

The system shown in FIG. 1 includes a circuit 9 for generating on a conductor 10 a full time base signal 24 (FIG. 2) having a predetermined time duration, and for generating on another conductor 11 a half time base signal 25 (FIG. 2) having a time duration which is one-half that of the full signal in response to a start signal on an input 13. The copending U.S. application of P.F. Sorensen, Ser. No. 194,986, filed Nov. 2, 1971, discloses a circuit which may be used for this purpose. Briefly, that circuit includes a binary counter which receives a train of pulses from a stable oscillator. The counter includes a series of connected flip-flops, each flip-flop in the series toggling the next flip-flop when its output goes from logic one, or high, to logic zero, or low. In addition to the counter flip-flops, a separate flip-flop is connected to the first and to the last flip-flops of the counter series, toggling of the first counter flip-flop setting the separate flip-flop and toggling of the last flip-flop of the counter series resetting the separate flip-flop. The Q output of the separate flip-flop provides the full time base signal on the conductor 10. The time duration of the full time base signal is determined both by the frequency of the stable oscillator and by the capacity of the binary counter. While the above-mentioned application does not disclose means for providing a one-half time base signal, this may be accomplished simply by connecting the conductor 11 to the Q output of the next from the last flip-flop of the counter series. This Q output shifts to logic one when this flip-flop is set, which occurs when the counter counts to one-half of its capacity. The Q outputs fall to logic zero on the last count, such fallings terminating the signals on the conductors 10 and 11.

The circuit 9 is preferably connected by a conductor 14 to receive the output of a transducer 16 which is also discussed in the above-mentioned Sorensen patent application. The transducer produces a symmetrical wave such as a sine wave, and includes means for converting the sine wave to a symmetrical square wave. As described in the above-mentioned Sorensen patent application, the leading or rising edge of the signal 24 on the conductor 10 essentially coincides with the leading edge of a square wave on the conductor 14. The transducer 16 may, for example be a device which responds to a parameter being measured and produces a signal having a frequency representative of the parameter. Before making such a measurement it is desirable to wait until the device has stabilized and the frequency is steady. A circuit in accordance with the present invention provides an indication of whether or not the transducer has stabilized and the frequency is unchanging.

The system shown in FIG. 1 includes three gates 17, 21 and 23, and each of the three gates is designed to be turned on when both of its input signals are high or at logic one. The conductor 10 is connected to one input of the gate 17, and the conductor 11 is connected to a second input of the gate 17 after being inverted by an inverter 18. During the first half of a full time base signal, the one-half time base signal is low and, due to the inverter 18, a high signal appears at the associated input to the gate 17. Both of the inputs of the gate 17 being high during the first half of the time base period, the gate 17 is turned on and a high output signal appears at the output 19 of the gate 17, the output 19 being connected to an input of another gate 21. The gate 21 has a second input which receives the square wave signal from the transducer 16, and when a high signal appears at the output 19, the output of the gate 21 corresponds to the transducer 16 output. The gate 21 output is connected to an input of an integrator. In the present illustration, the gate 21 is connected to an up-count input of an up-down counter 22.

The conductor 11 is also connected to an input of the gate 23, and a second input of the gate 23 is connected to receive the signal from the transducer 16. Since the half time base signal is low during the first half of the full time base signal, the gate 23 is turned off and blocks the signal from the transducer 16.

Thus, during the first half of the time base signal, the square wave signal from the transducer 16 passes through the gate 21 to the counter 22 which is designed to count up the number of trailing or falling edges of the square wave, occurring within the the first half of the full time base signal. As described in the previously mentioned Sorensen application, counting accuracy is improved by initiating the time base in synchronism with the leading edge of a square wave and counting on the trailing edges.

At the end of the first half of the full time base signal, the half time base signal on the conductor 11 rises to logic one, causing the gate 23 to be turned on and the gates 17 and 21 to be turned off. The signal from the transducer 16 then flows through the gate 23 to the down-count input of the counter 22, and the counter 22 downcounts on the leading or rising edges of the square wave from the transducer 16. At the end of the time base periods, the signals on both conductors 10 and 11 fall to zero and both gates 21 and 23 are turned off.

Figure 2:
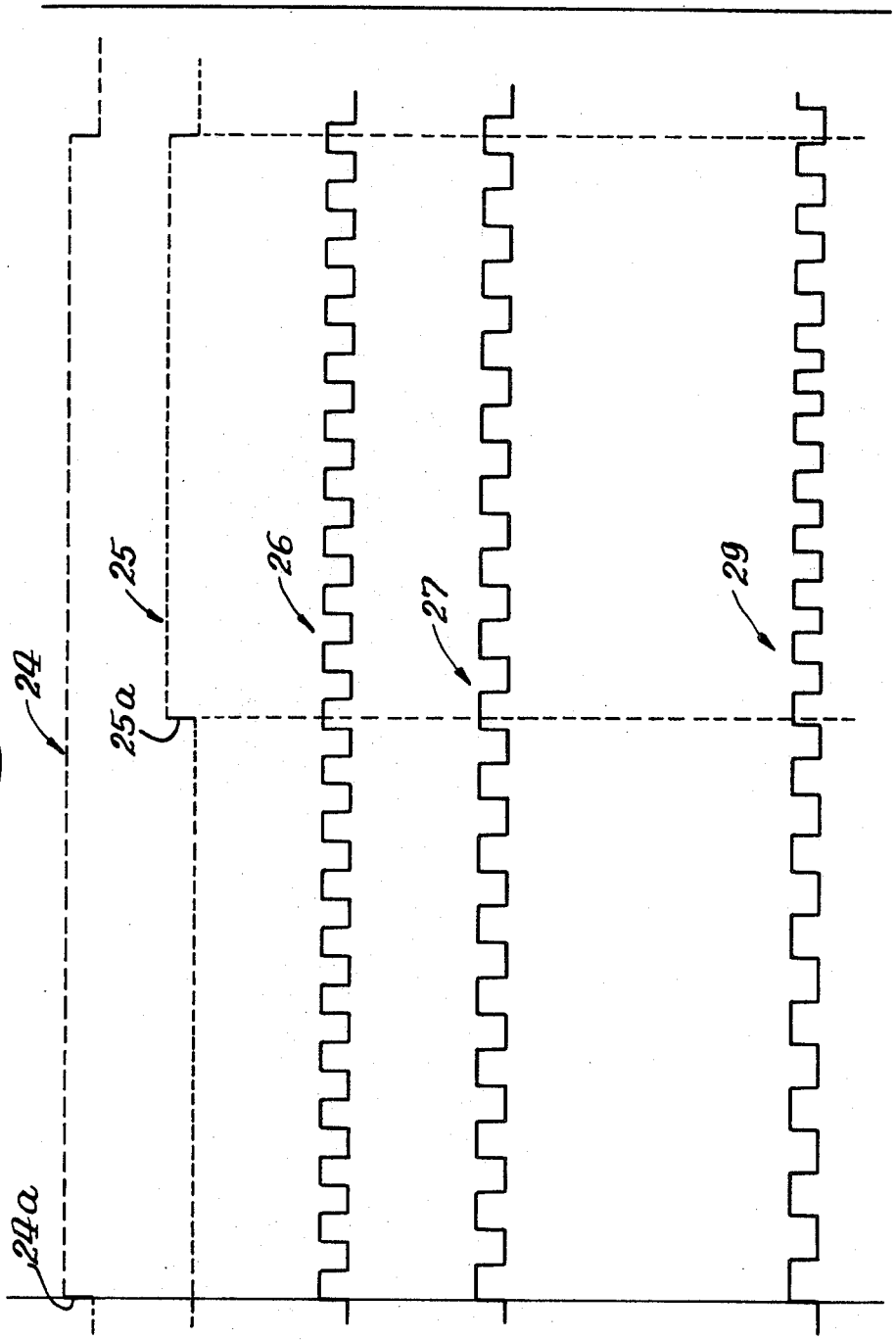
FIG. 2 is a schedule of waveforms illustrating the operation of the invention.

FIG. 2 is a schedule of waveforms illustrating the operation of the circuit shown in FIG. 1. The full time base signal on the conductor 10 is represented by the reference numeral 24 and the half base time signal on the conductor 11 is represented by the reference numeral 25, which is one-half the length of the full time base signal. The numeral 26 represents a square wave produced by the transducer 16, the square wave 26 having, in the present illustration, a constant frequency throughout the time duration of the full time base signal 24. The leading edge 24a of the signal 24 essentially coincides with the leading edge 26a of a cycle of the square wave 26. The leading or rising edge 25a of the half time base signal 25 occurs half way through the full time signal 24, and both signals 24 and 25 terminate simultaneously.

With reference to the square wave 26, approximately 11⅙ cycles occur during both the first half and the second half of the full period of the signal 24. Counting the trailing or falling edges of the cycles occurring during the first half and the leading or rising edges of the cycles occurring during the second half shows that 10 falling edges occur during the first half and 10 rising edges occur during the second half, thus indicating that the frequency of the square wave 26 has not changed during the full time base signal 24.

If the rising edges of the square wave 26 had been counted during both counting periods, 11 counts would have been registered during the first counting period and 10 counts would have been registered during the second counting period. Such operation obviously would provide an erroneous indication since the frequency has remained constant during both counting periods.

The reference numeral 27 represents another square wave having a frequency slightly lower than the frequency of the square wave 26, but again, the frequency of the square wave 27 does not vary during the time duration of the signal 24. A total of approximately 8⅓ cycles of the square wave 27 occur during each counting period or half of the full time base signal 24. Eight falling edges are counted during the first period and eight rising edges are counted during the second period, indicating that no change in frequency has taken place. Again, it should be noted that nine rising edges of the square wave 27 occur during the first period, and consequently an erroneous output would have been provided if rising edges had been counted in both periods.

At other frequencies, errors would be encountered if the falling edges were counted during both periods. Where the first counting period is initiated in synchronism with the rising edge of a square wave, accuracy is improved by counting the falling edges during the first period and rising edges during the second period. The reference numeral 29 indicates another square wave wherein the frequency during the first period is lower than the frequency during the second period. Approximately 7 1/16 cycles of the wave 29 occur during the first period and approximately 10 7/16 cycles occur during the second period. Seven falling edges of the wave 29 are counted during the first period and 10 rising edges are counted during the second period. The two counts are of course different and a remainder detector 20 (FIG. 1) detects the count of three remaining in the counter 22. The remainder detector 20 may be connected to receive the full time base signal 24 so that it interrogates the up-down counter 22 at the end of the signal 24, and it may provide an output signal to an indicator or to any circuit that responds to a frequency change or lack of such a change.

Figure 3:
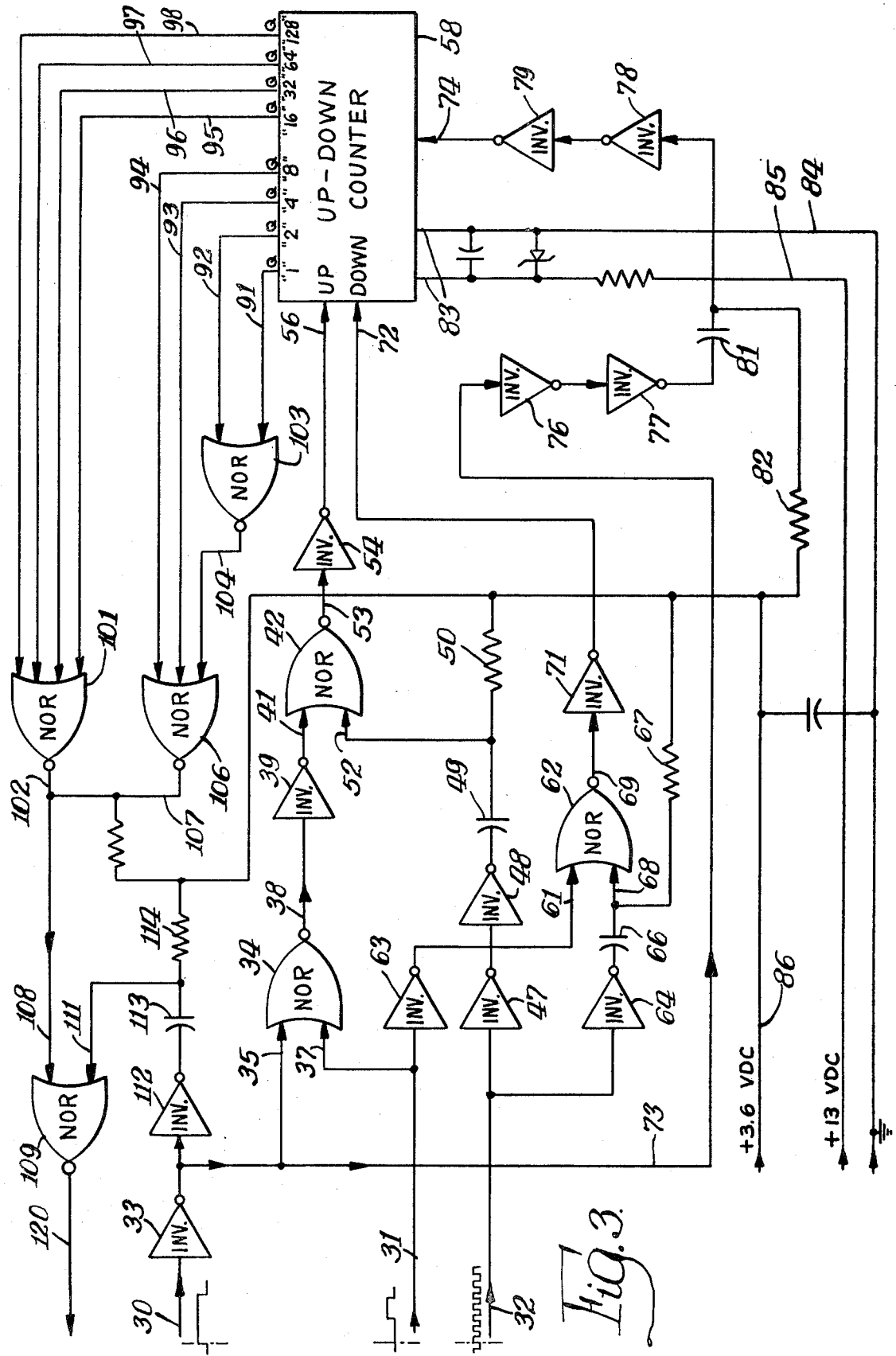
FIG. 3 is a drawing showing in detail a circuit incorporating the invention.

While the circuits shown in FIGS. 1 and 3 are shown and described as switching in response to time base signals produced by a time base circuit, a timer could be used in place of the time base circuit, such timer being connected to control the gates to route the square wave signal to the two counter inputs during the two periods.

FIG. 3 illustrates in detail the construction and operation of a circuit which operates similarly to the circuit shown in FIG. 1 but which differs somewhat in respect to the gating arrangement. The full time base signal 24 is received on a conductor 30, the half time base signal 25 is received on a conductor 31, and the square wave signal from the transducer 16 is received on a conductor 32. The circuit includes an inverter 33 connected to receive the signal 24 on the conductor 30, and a NOR gate 34 which has an input 35 connected to the output of the inverter 33. The NOR gate 34 has a second input 37 which is connected to receive the half time base signal 25 on the conductor 31. During the first half of the signal 24, the signal 24 is high or at logic one, and due to the inverter 33, a logic zero appears at the input 35. Simultaneously, the half time base signal 25 is low or at logic zero and a low signal appears at the input 37. With both inputs of the gate 34 low, a logic one signal appears at its output 38 which is inverted by another inverter 39. Consequently, a logic zero appears at an input 41 of another NOR gate 42 during the first half of the full time base signal 24.

Further, during the first half of the full time base signal 24, the square wave from the transducer 16 passes through a series connection of two inverters 47 and 48 and through an RC pulse shaping network including a capacitor 49 and a resistor 50. The junction between the latter two components is connected to another input 52 of the NOR gate 42, and the resistor 50 is connected to a conductor 86 which is connected to a source of, for example, +3.6 VDC.

Due to the two inverters 47 and 48, the square wave from the transducer 16 appears at the output of the inverter 48, and the RC network produces a negative or falling pulse coinciding with each falling edge of the square wave on the conductor 32. The input 52 of the gate 42 is normally high and the input 41 is low during the first half of the time base signal 24, and therefore the output 53 of the gate 42 is normally low. A negative pulse on the input 52 momentarily turns the gate 42 on thus forming a positive pulse at the output 53. This positive pulse is inverted by an inverter 54 to form a negative pulse which is fed to the count-up input 56 of an up-down counter 58. In the present illustration, the counter 58 comprises an eight bit counter including eight connected flip-flops. Thus, the falling edges of the square wave cause the counter 58 to count up during the first half of the full time base signal 24 until, at the end of this first counting period, the half time base signal 25 on the conductor 31 rises to logic one and turns off the gate 34.

Simultaneously, the transition to logic one of the half time base signal 25 causes a logic zero signal to appear at in input 61 of another NOR gate 62, an inverter 63 being interposed between the conductor 31 and the NOR gate 62. The square wave signal on the conductor 32 passes through another inverter 64 to another RC pulse shaping network including a capacitor 66 and a resistor 67, and a negative pulse appears on an input 68 of the NOR gate 62 for each falling edge of the signal out of the inverter 64. The input 68 is normally high due to a connection between the resistor 67 and the conductor 86, and since the other input 61 is low during the second half of the full time base, the output 69 of the NOR gate 62 is normally at logic zero. The negative pulse appearing at the input 68 causes the output 69 to rise momentarily to logic one, and this momentary rise, or pulse, is inverted by another inverter 71, resulting in a negative pulse appearing on a down-count input 72 of the counter 58 for each rising edge of the transducer square wave occuring during the second counting period or half of the full time base signal.

At the end of the counting periods, the signals 24 and 25 on the conductors 30 and 31 fall to zero, resulting in the two gates 34 and 62 being turned off and blocking the square wave from passing to either input 56 or 72 of the counter 58.

As previously mentioned, at the beginning of a time base the rising edge 24a of the signal 24 on the conductor 30 causes a logic zero signal to appear on a conductor 73 connected to the output of the inverter 33. The conductor 73 is connected to a reset or clear input 74 of the counter 48 through a series connection of four inverters 76 to 79 and an RC pulse shaping network including a capacitor 81 and a resistor 82. The rising edge 24a causes a negative pulse to appear at the input 74 to clear the counter 58 at the beginning of a measuring cycle.

The counter 58 also includes a power input indicated generally by the reference numeral 83, a conductor 84 being connected between the power input and ground, and another conductor 85 being connected between the input and a DC source of, for example, +13 volts. Another conductor 86 is connected to, for example, +3.6 VDC.

As previously mentioned, the counter 58 comprises, in the present instance, an eight-bit up-down counter, and has eight output conductors 91 through 98. The conductors 91 to 98 are respectively connected to the Q outputs of the "1," the "2," the "4," the "8," the "16," the "32," the "64," and the "128" flip-flops. A pulse on the clear input 74 sets the "2" flip-flop and resets the remaining flip-flops, and consequently the conductors 91 and 93 through 98 are at logic zero and the conductor 92 is at logic one. Thus, the counter 58 is preset to a count of 2. Such a preset is not necessary but is desirable in some instances because, with the gating arrangement to be described, a difference in counts between the two counting periods of zero plus or minus one indicates no change in frequency.

The outputs 91 to 98 are connected to an interrogating circuit which indicates, at the end of the two counting periods, whether any difference in the two counts is tolerable or excessive. The four conductors 95 through 98 are connected to four inputs of a NOR gate 101, and when all of the conductors 95 through 98 are at logic zero, the gate 101 is turned on and the output 102 of the gate 101 is high. The conductors 91 and 92 are connected to two inputs of a NOR gate 103 which has its output 104 connected to input of another NOR gate 106. The conductors 93 and 94 are connected to two additional inputs of the NOR gate 106, and the output 107 of the NOR gate 106 is connected to the output 102 of the gate 101 and to an input 108 of still another NOR gate 109. The gate 109 has a second input 111 connected to receive the full time base signal 24 appearing on the conductor 30, through the inverter 33, another inverter 112 and an RC pulse shaping network including a capacitor 113 and a resistor 114. The falling edge of the full time base signal, at the end of the second counting period, causes a negative pulse to appear at the input 111 of the gate 109.

At the end of the counting period, if the frequency has not changed during the up count and the down count, the conductors 91 and 93 through 98 will all be at logic zero, and the conductor 92 will be at logic one. The output 102 of the gate 101 will be at logic one, but since the conductor 92 is at logic one, logic zero appears on the output 104 of the gate 103. Thus, the three inputs to the NOR gate 106 will be at logic zero and therefore the output 107 will be at logic one. When the negative interrogating pulse appears at the input 111, the logic one signal at the input 108 results in a logic zero signal at the output 120 of the NOR gate 109, this latter signal indicating that the frequency either has not changed during the two counting periods or, if it has changed, the difference in counts is within tolerable limits.

If the counter 58 counts up one more cycle during the first half of the full time base signal than down during the second half, the remainder in the counter 58 will be three because of the preset number two and the frequency difference of one. Thus, the conductors 91 and 92 will both be at logic one and the output 104 of the gate 103 will again be at logic zero, similar to the preceding example where the counter was returned to its initial state. Thus, the system indicates no frequency change even though there is one cycle difference in the two counts.

If the counter 58 counts up one cycle during the first half less than down during the second half, the remainder in the counter 58 will be one. The conductor 91 will be high and the conductor 92 will be low and again the gate 103 output will be low. Consequently, the system again indicates no frequency change even though there is a frequency difference of one.

If the counter 58 counts two more cycles in the first period than are counted in the second period, the residual count in the counter 58 will be four. The conductors 91 and 92 will be low and the conductor 93 will be high. The high signal on the conductor 93 causes the gate 106 to be low, which causes the input 108 to be logic zero. The negative interrogating pulse appearing on the input 111 of the gate 109 results in a positive pulse at the output 120, indicating that an excessive frequency difference has occurred.

It will be apparent that, when there is a remainder count of one, two or three, one or both of the outputs 91 and 92 will be high, the output 104 will be low, the output 107 will be high and the output 120 will remain low when the interrogating pulse appears on the input 111. If the count remaining at the end of the two counting periods is two plus or minus two or more, a positive pulse will appear on the output 120 in response to an interrogating pulse.

In some instances it may be desirable to detect a difference of a single count between the two periods, or to tolerate a count difference of more than plus or minus one. The arrangement of the counter 58 and the gates connected to the counter outputs may be fashioned to obtain the desired result.

While in the present illustration all of the flip-flops of the counter 58 are interrogated at the end of the second period, an arrangement may be used where only the lowest two or three digits are interrogated, with little chance of error. While an up-down binary counter has been illustrated and described, it should be apparent that other types of counters, such as a decade counter, could be used. Further, instead of an up-down counter, two separate counters, one for each counting period, could be used in conjunction with means for comparing the counts of the two counters. In accordance with the present invention, any type of integrating means, which in the present illustration is a counter, may be provided to receive the analog signal (the variable frequency signal in the present illustration) and to integrate the signal during each period.

While two counting periods of equal time duration have been described, it would of course be possible to have two periods of unequal duration and fashion the counter and interrogating circuit to tolerate a corresponding difference in counts.

It should be apparent that the circuits disclosed herein may be composed of either electric or fluidic circuit components.

While the assignment of logic levels described herein for illustration purposes is the case where logic one is high and logic zero is low, it should be realized that an opposite assignment could be made where logic one is low and logic zero is high. In a system of the latter character, the NOR gates disclosed herein would be replaced by NAND components and the OR gates would be replaced by AND components.

The invention described herein is highly advantageous because it readily permits a determination of whether a parameter, represented by an analog signal, is steady or is changing, and because the circuit may be arranged to tolerate a change within acceptable limits.

We claim:

1. A detecting circuit for detecting a change in the frequency of a variable frequency substantially symmetrical signal having a leading edge and a trailing edge in each cycle, comprising counting means, means connecting said signal to said counting means during one period and during another period, said counting means making a count of said leading edges during said one period and another count of said trailing edges during said other period, and detecting means connected to said counting means and responsive to a difference between said two counts.

2. A circuit as in claim 1, wherein said one period is initiated essentially in synchronism with the leading edge of a cycle.

3. A circuit as in claim 1, wherein said connecting means comprises time base signal generating means and gating means connected to receive at least one time base signal from said generating means for connecting said variable frequency signal to said counting means during said periods.

4. A circuit as in claim 3, wherein said counting means is an up-down counter, and said time base signal generating means provides two time base signals, one time base signal having twice the time duration as the other time base signal, said connecting means responding to said two time base signals to connect said variable frequency signal to cause said counter to count up during said one period and to count down during said other period.

5. A circuit as in claim 1, wherein said up-down counter is preset to a count of two prior to said periods, and said difference responsive means indicates when the count at the end of said other period is greater than two plus or minus one.

6. A circuit as in claim 3, wherein said time base signal is connected to clear said counting means at the beginning of said one period, and is connected to actuate said detecting means at the end of said other period.

7. A circuit for detecting a change in a symmetrical cyclically varying signal which in each cycle includes a first point and a second point that is displaced one-half cycle from said first point, comprising integrating means, means connected to said integrating means and forming first and second time periods, said integrating means being adapted to receive said signal during said first and second periods and form a first integration of said first points and a second integration of said second points, and detecting means connected to said integrating means and responsive to a difference between said first and second integrations at the end of said periods.

* * * * *